Dec. 19, 1967  L. E. THOMAS ET AL  3,358,853
SHEET HANDLING DEVICE
Filed Oct. 11, 1965  7 Sheets-Sheet 1
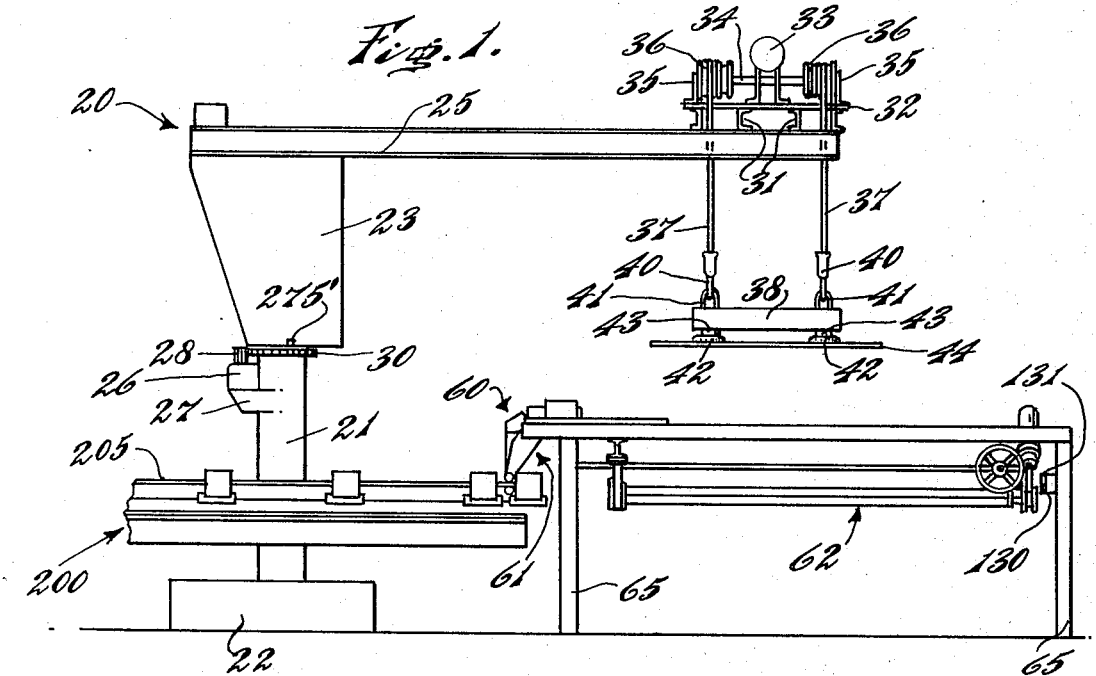
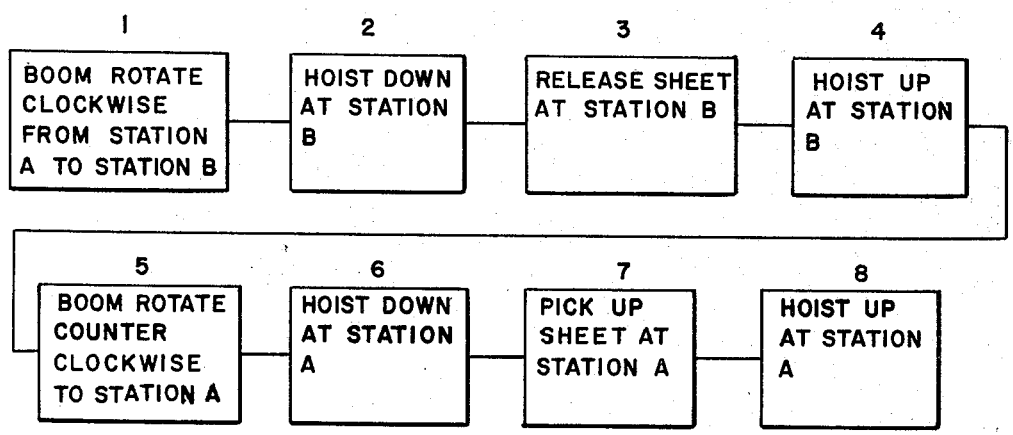
INVENTORS
Lucius Earl Thomas
Walton Rainey
BY
ATTORNEYS

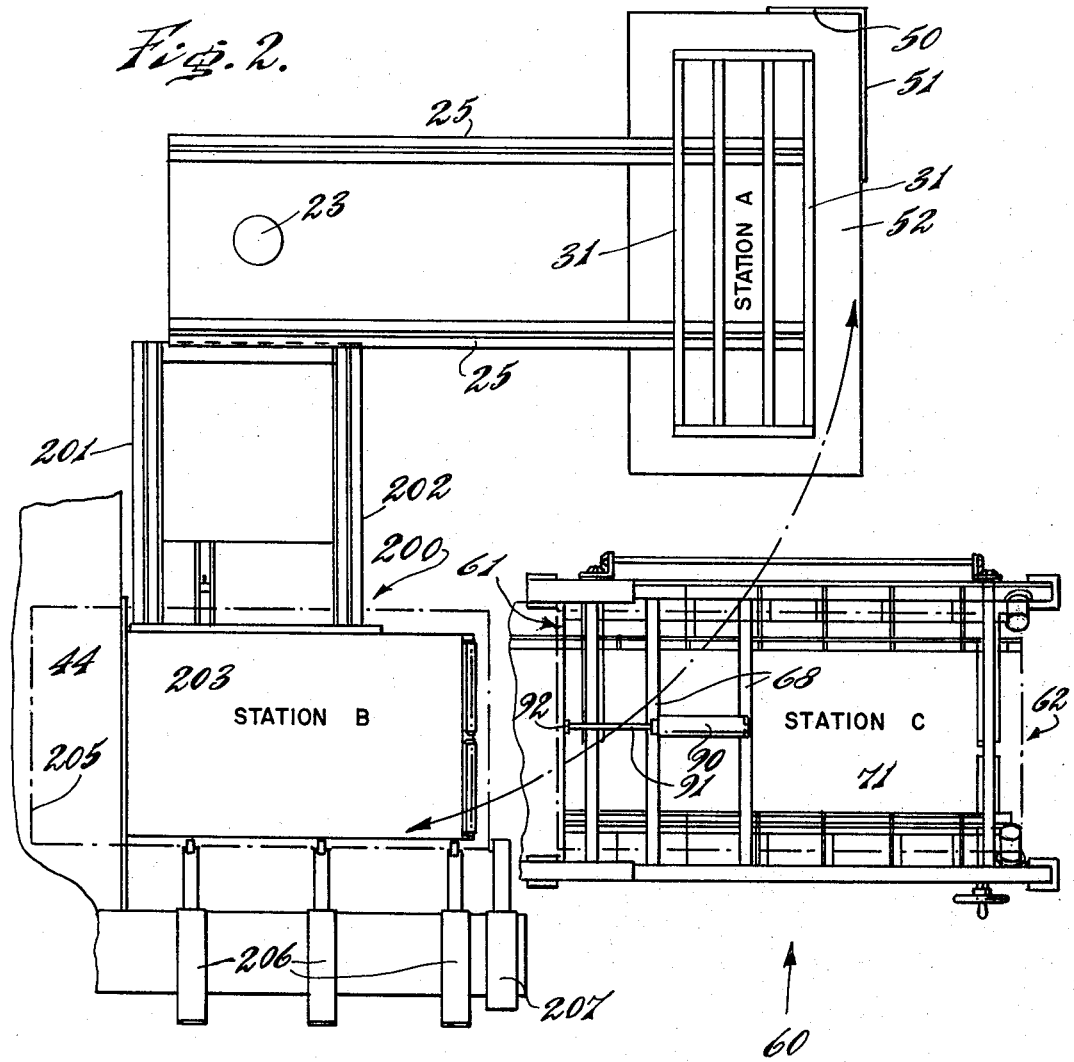

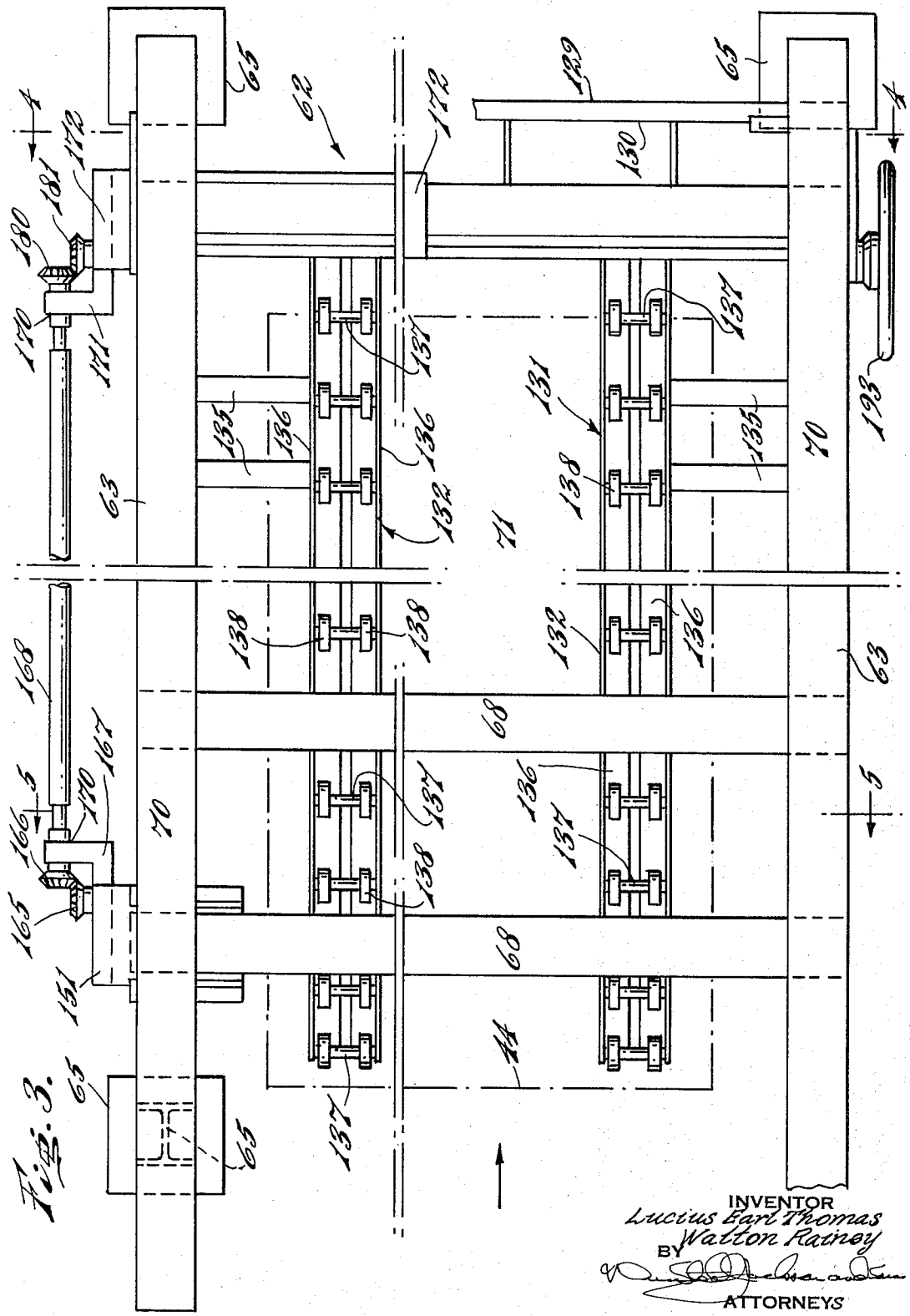

Dec. 19, 1967     L. E. THOMAS ET AL     3,358,853
SHEET HANDLING DEVICE
Filed Oct. 11, 1965     7 Sheets-Sheet 5
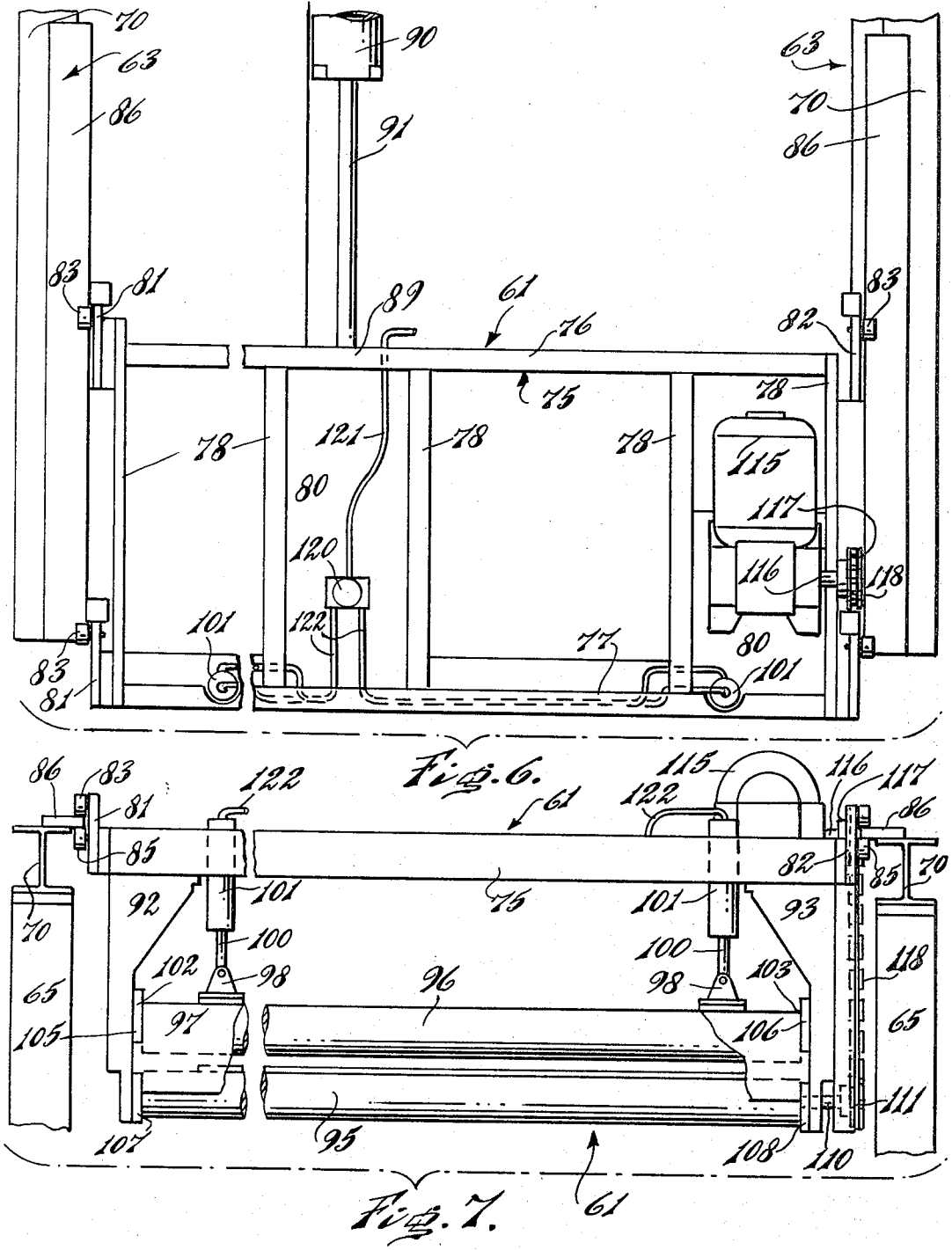
INVENTORS
Lucius Earl Thomas
Walton Rainey
BY
ATTORNEYS

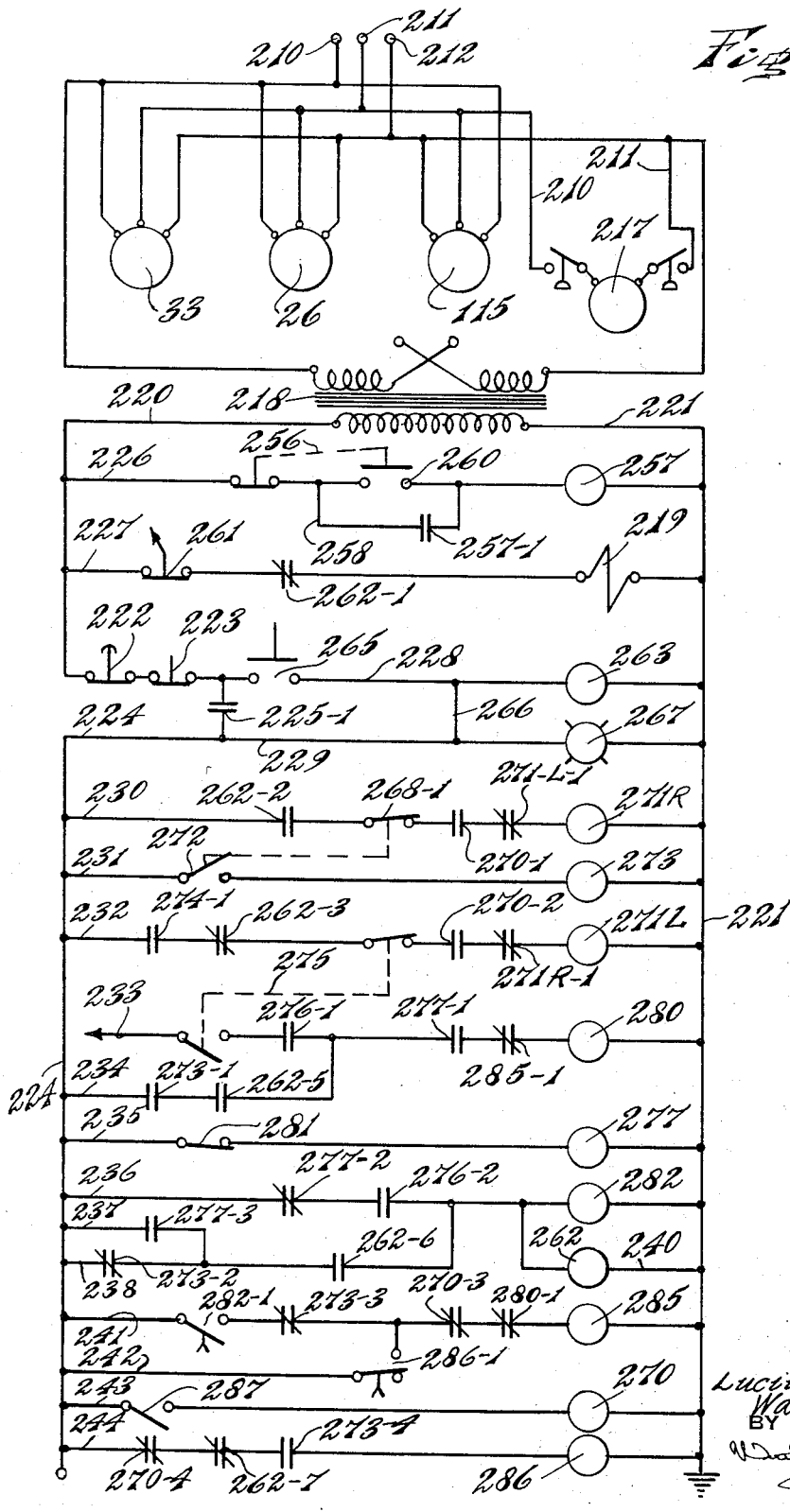

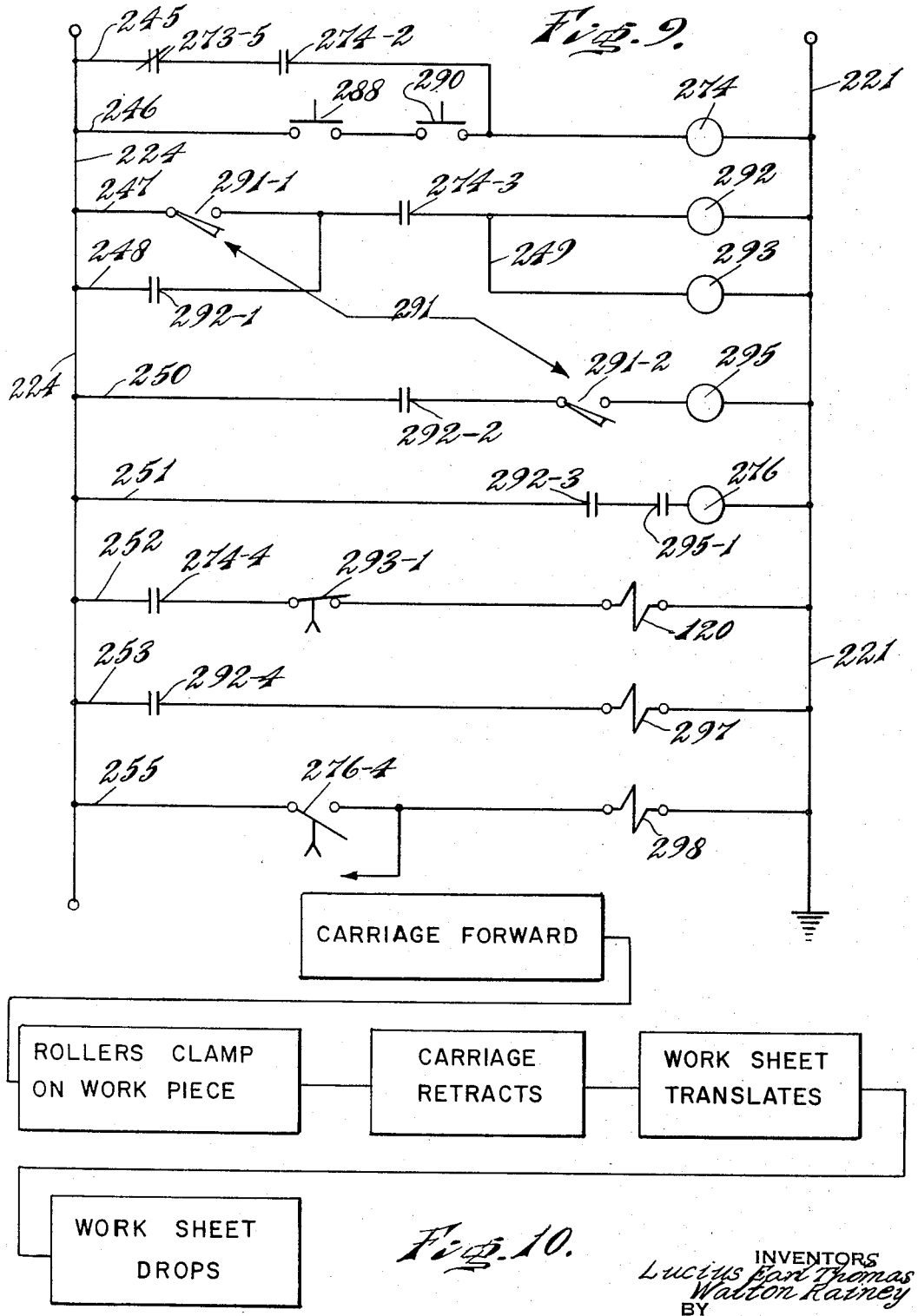

United States Patent Office 3,358,853
Patented Dec. 19, 1967

3,358,853
SHEET HANDLING DEVICE
Lucius Earl Thomas, Norristown, and Walton Rainey, Ardmore, Pa., assignors to The Warner & Swasey Company, Cleveland, Ohio, a corporation of Ohio
Filed Oct. 11, 1965, Ser. No. 494,349
6 Claims. (Cl. 214—6)

ABSTRACT OF THE DISCLOSURE

This invention comprises an automatically operated loader and an unloader for placing and removing individual metal sheets in a machine tool, such as a punch press, for a machine operation. The loader includes a rotating jib crane, and the unloader includes a reciprocating carriage with rotating pinch rolls and a stacker with drop bay doors. Sheets are fed to the machine from a first stack and removed from the machine to a second stack.

---

The subject matter of this invention relates to a method and structure for handling metal work sheets and more particularly for simultaneously loading work sheets into a machine tool for a series of machine operations and unloading these sheets from the machine tool.

A purpose of the invention is to automatically take a sheet from a first stack at a first location, place the sheet on a machine tool, allowing the machine to process the sheet, remove the sheet from the machine tool, and place the sheet on a second stack at a second location.

A further purpose is to simultaneously load and unload sheets from a machine tool.

A further purpose is to handle a variety of sheet sizes in a machine tool loader and unloader.

A further purpose is to feed a stack of sheets to a loader with, for instance, a forklift truck, take an individual sheet from the stack and place it on the machine tool, and then remove the sheet from the machine tool and place it on a stack of finished sheets.

A further purpose is to use a set of traveling rollers to pass a sheet from the gauging table of a machine tool to a drop bay assembly.

A further purpose is to automatically move a work sheet through three positions, referred to for illustration as station A, station B and station C.

A further purpose is to rotate a work sheet from station A to station B in an upper horizontal plane while permissibly translating a work sheet from station B to station C in a lower horizontal plane.

A further purpose is to load a work sheet vertically onto a table assembly at station B and unload a work sheet horizontally from a table assembly at station B to station C.

A further purpose is to vertically drop a work sheet at station C from an upper level to a stack.

A further purpose is to automatically control all the loading and unloading operation.

Further purposes appear in the specification and in the claims.

In the drawings one only of the numerous embodiments in which the invention may appear has been illustrated, choosing the form shown from the standpoints of convenience in illustration, satisfactory operation and clear demonstration of the principles involved.

FIGURE 1 is a front elevation of the loader assembly, and the unloader assembly of the invention, in use with a machine tool gauging table.

FIGURE 2 is a top plan view of the loader, the gauging table and the unloader of the invention shown in FIGURE 1.

FIGURE 3 is a top plan view of the stacker assembly of the invention.

FIGURE 6 is a plan view of the pinch-roll sub-assembly of the invention.

FIGURE 7 is an end elevation of the pinch-roll sub-assembly of FIGURE 6.

FIGURE 8 is a partial wiring diagram of the electrical circuitry of the invention.

FIGURE 9 is a partial wiring diagram of the electrical circuitry of the invention.

FIGURE 10 is a block diagram of the steps performed by the unloader assembly of the invention.

FIGURE 11 is a block diagram of the steps performed by the loader assembly of the invention.

Figure 4:
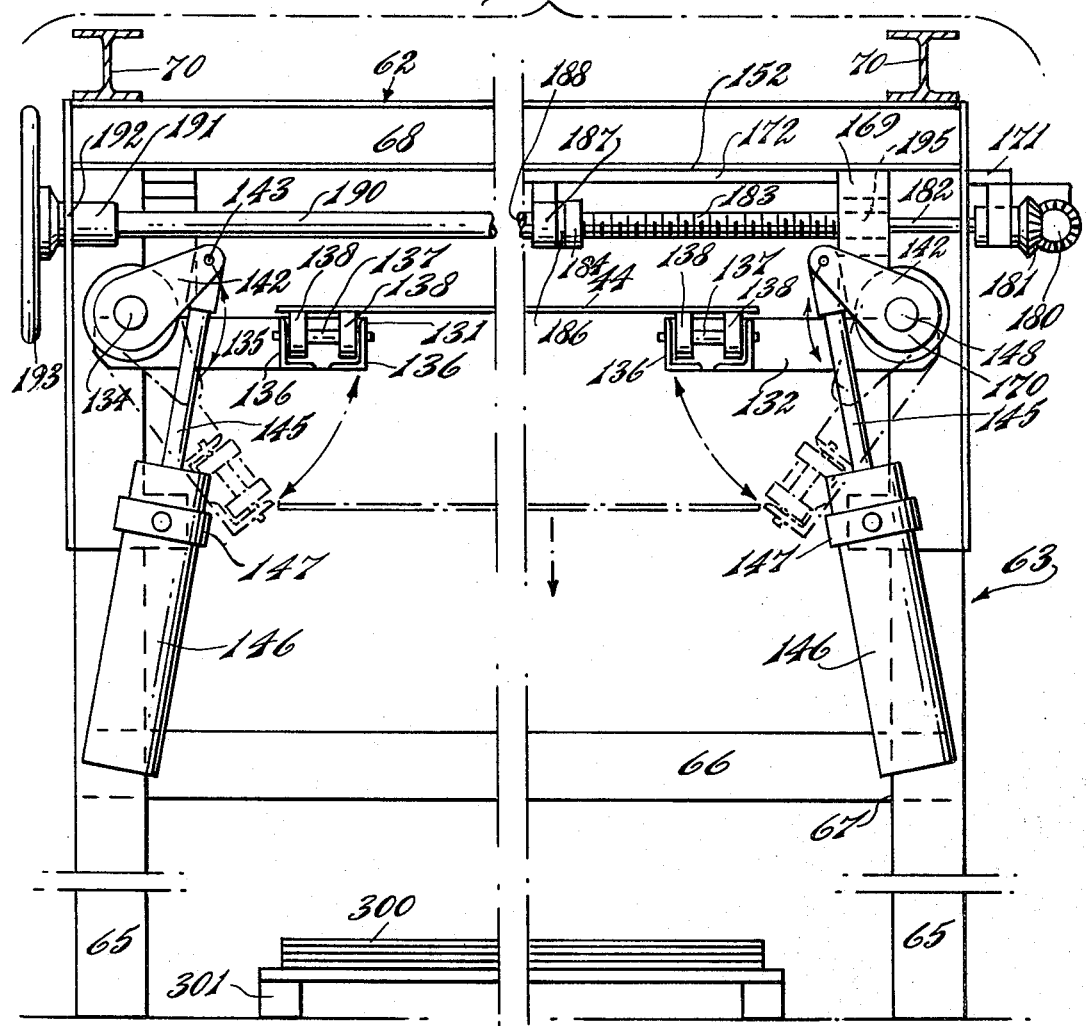
FIGURE 4 is an end elevation taken on the line 4—4 of FIGURE 3.

Describing in illustration but not in limitation and referring to the drawings:

In sheet metal fabrication and working, extensive use is made of machine tools which drill, punch, mill bend, cut and otherwise alter the flat sheet or plate at a plurality of points on the piece. The machine tool has a reference position onto which the work sheet to be processed is loaded. The sheet is usually placed at the reference position on a gauging table which is movable and part of the machine tool. The gauging table, along with the work sheet, is normally moved automatically, by means of stored intelligence on devices such as tapes, into various positions within the machine for the machining operations. At the end of the machining or punching operation, the gauging table automatically returns to the reference position carrying the sheet with it.

The finished work sheet is then unloaded from the machine tool.

In the operation described above, it has been conventional in the prior art to load and unload the sheet into the machine tool, at the reference position, manually.

In the present invention, loading and unloading of work sheets into a reference position on a machine tool is done automatically. A stack of work sheets is delivered to a first station by, for instance, a forklift truck and there deposited on the floor of the work area. An automatically controlled loader picks up one of the work sheets and transfers it to the reference area of the machine tool, suitably a gauging table. Simultaneously, a previously punched sheet is taken from the reference area of the machine tool and deposited in a stack at another location from where a forklift truck or the like can remove the finished stack of work sheets. Thus, any need for manual feeding and removing of the work sheets from the gauging table is eliminated and the entire operation can proceed with a minimum of manual handling.

Summary of invention

By way of summary, in the device of the invention, a loader automatically transfers individual sheets from a first stack of sheets at a position illustratively designated station A to a reference position, illustratively designated station B, on a machine tool, and an unloader automatically transfers individual sheets from station B to a stack of sheets at a position illustratively designated station C. The loader and unloader operate simultaneously and automatically.

The loader comprises a power operated rotating jib crane and a power hoist at the pickup end of the crane supporting a vacuum pickup system capable of lifting a range of sheet sizes. Typical sheet sizes range from a maximum of 60 by 120 inches to a minimum of 24 by 30 inches. The loader transfers a sheet by lifting it vertically at station A, rotating it from station A to station B, and then lowering it into the reference position on the gauging table.

The unloader transfers the completed work sheet from the reference position or station B to station C, the stacking position. The unloader includes a carriage which moves over the work sheet and which contains a system of power operated rotating pinch-rolls that clamp on the work sheet and translate the work sheet into drop bays above station C. The drop bays are in the form of horizontally hinged doors which can be adjusted to accommodate various size sheets and which are rotated downward by means of air cylinders to discharge the sheets onto a wooden pallet or other suitable device.

Electrical and manual controls automatically operate the loader and unloader.

Details of invention

Considering the invention in detail and referring to the drawings, the entire structure consists of a loader assembly, an unloader assembly which includes a pinch-roll sub-assembly and a drop bay stacker sub-assembly, and automatic controls for the loader and unloader.

Loader

The loader assembly 20 has a column 21 suitably circular in cross section anchored in a base 22. The column has journalled on its top portion a bearing 23 which includes upper and lower radial bearings and suitable thrust bearings to properly rotatably support cantilever beams 25 which extend horizontally and are free to rotate within a horizontal plane. The details of this suspension can be that of any conventional jib crane. A gear motor 26 is supported from the column 21 by brackets 27 and drives pinion 28 which engages with external ring gear 30 which is secured to bearing 23. Thus, beams 25 can be rotated either in a clockwise or counterclockwise direction by driving gear motor 26 in the proper direction to provide rotational drive to ring gear 30. The electrical circuitry and controls to the gear motor will be described later. At the end of cantilever beams 25, there are a plurality of transverse short sections of channels 31 which receive thereon a plate 32 which houses hoist motor drive 33 which has extending therefrom a shaft 34. The shaft 34 is journalled in brackets 35 at the ends thereof.

Shaft 34 has a plurality of drums 36 which are keyed thereon and which receive cables 37 which are wrapped over the drums and support at their ends a hoist platform 38 by means of a plurality of hooks 40 which engage U bolts 41 on the platform 38. The platform 38 has suitably dependent therefrom a plurality of vacuum cups 42 which can be selectively energized by means of a mechanical shut-off valve 43 which is positioned in the cup. A source of vacuum from a vacuum pump is connected to the vacuum cups 42.

The hoist platform 38 is positioned as seen in FIGURE 2, directly over an area which will be designated station A. Station A is defined by transversely disposed locating walls 50 and 51 which are suitably anchored in the floor wherein a stack of work sheets 52 is brought into position and located with reference to locating abutments 50 and 51. This location of the reference abutments 50 and 51 at station A is determined by having the radius of the rotating cantilever beams 25 about the center of the column 21 such that when the cantilever beams 25 rotate and deposit the stack onto station B as will later be more fully described, the work sheet will be properly positioned on the table assembly.

Unloader

The unloader assembly 60 which consists of the pinch-roll sub-assembly 61 and the drop bay stacker sub-assembly 62 has a frame 63 composed of four vertically extending supports 65 which are positioned at the corners of a rectangle. Channels 66 extend transversely from and are suitably connected to the vertical supports at 67. Upper transverse I beams 68 extend between the vertical supports 65 and are secured thereto by welding or the like. Longitudinally extending I beams 70 extend along the top of the members 68 and the members 65 and project as seen in FIGURE 3 from a position over the drop bay stacker area 71 to a cantilever position adjoining the table assembly.

The pinch-roller sub-assembly 61 includes a carriage 75 slidably supported from the frame 63 as best seen in FIGURES 6 and 7 which is composed of two longitudinally extending channels 76 and 77 and a suitable number of transversely extending channels 78. The frame has welded thereon a series of flat plates 80. At the sides of the carriage 75 and connected thereto as by bolting, left hand carriage brackets 81 and right hand carriage brackets 82 journal upper rollers 83 and lower rollers 85 which ride in engagement with a track 86 which is bolted to I beam 70. The rollers 83 and 85 are journalled on stud shafts extending from the brackets 81 and 82. I beams 70 extend in continuation from the frame 63 as has been explained. The carriage 75 is thus adapted to ride parallel to the beams 70.

A double acting air cylinder 90 is mounted on transverse channels 68 of the frame 63 and has extending therefrom a piston rod 91 which is connected at 89 to the carriage 75. The cylinder 90 by being selectively actuated can extend the carriage 75 along the track 86 in a forward direction toward the machine tool or can retract the carriage 75 in a rearward direction away from the machine tool.

A left roll support bracket 92 and a right roll support bracket 93 extend vertically downward from the carriage 75 and are connected thereto as by bolting. Journalled in the brackets is a stationary lower drive roll 95 and an upper movable idler roll 96. The idler roll is adapted to translate vertically within slots in the brackets 92 and 93. Roll 96 is journalled within a support 97 which has secured thereto yokes 98 connected to piston rods 100 extending from double acting air cylinders 101. The support 97 for the idler roll 96 is constructed of an inverted channel which is secured at 102 and 103 to bearing blocks 105 and 106 which journal the idler roll 96. The bearing blocks 105 and 106 slide within the said vertically disposed slots in the brackets 92 and 93.

The drive roll 95 is journalled in bearing blocks 107 and 108 which are fixed to the left and right hand brackets 92 and 93, respectively. A shaft 110 which is suitably integral with drive roller 95 extends through bracket 93 and has keyed thereon a sprocket 111.

Positioned on plate 80 in the carriage 75 is a gear motor 115 which drives a shaft 116 which in turn drives a sprocket 117 which engages sprocket chain 118 which meshes with drive roll sprocket 111.

Four-way valve 120 controls air pressure through line 121 selectively into lines 122 whereby cylinders 101 are energized to withdraw or extend piston rods 100 whereby the idler roll 96 moves downward in the carriage to grasp the work sheet from the table assembly as desired.

Figure 5:
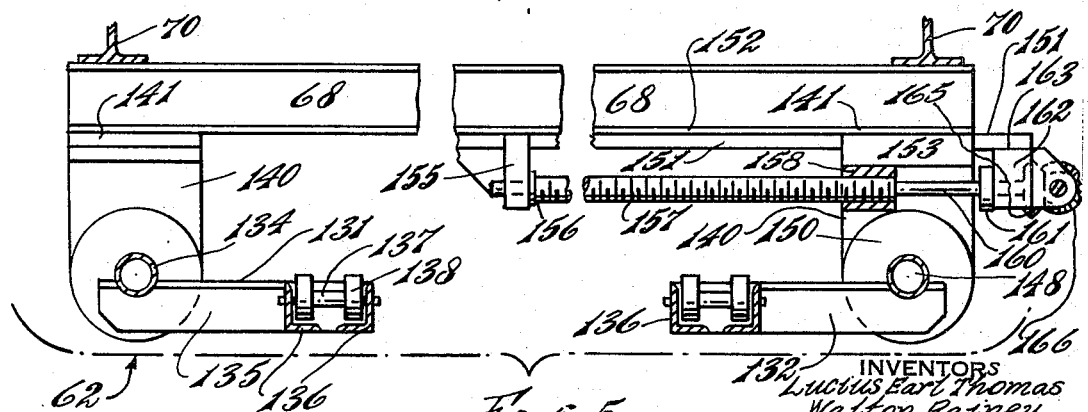
FIGURE 5 is a sectional elevation taken on the line 5—5 of FIGURE 3.

Referring now to the drop bay stacker, sub-assembly 62, as best seen in FIGURES 3, 4, and 5, a sheet stop 129 is bolted or otherwise fastened to vertical supports 65 and has thereon a bumper surface 130 which acts as a stop for the work sheet being delivered into the stacker. A front drop bay 131 and a rear drop bay 132 are pivoted from the frame 63. The front drop bay 131 has thereon a shaft 134 of, for instance, seamless tubing which has extending therefrom a plurality of transverse angles 135 which are suitably welded to a pair of longitudinal angles 136, which as seen in end elevation in FIGURE 4, form a journal support for shafts 137 which have keyed thereon rollers 138. The shaft 134 is journailed in brackets 140 which are suitably connected to upper transverse I beams 68 as by welding or the like at 141. Keyed on shaft 134 is yoke 142 which pivotally connects at 143 to piston rod 145 which extends from double acting cylinder 146 which is mounted in trunnions 147 pivotally secured to vertically extending supports 65. The cylinders 146 have suitable air lines connecting thereto for selectively extending and retracting the piston rod 145 into the cylinder 146.

The rear drop bay 132 is of the same construction as the front drop bay and similar characters have been used to indicate similar elements.

The rear drop bay shaft 148 is pivotally supported in rear drop bay bracket 150, as seen in FIGURE 5, which is slidably secured to tracks 151 which are welded or otherwise fixedly secured to cross beam 68 at 152. Flange 153 of bracket 150 is shaped in cross section to suitably slidably wrap around the tracks 151 so that proper support is given to bracket 150 vertically while allowing the bracket to slide longitudinally along the tracks 151.

An abutment 155, as seen in FIGURE 5, extends from one of the beams 68 and supports therein thrust bearing 156 which receives left hand lead screw 157 which threads in left hand acme nut 158 which is welded or otherwise secured to rear drop bay bracket 150. Extension 160 of shaft 157 has thereon collar 161 which bears against bearing stop 162 which is fixed to the end of the track 151 at 163. The shaft extension 160 has keyed thereon bevel gear 165 which meshes with bevel gear 166 journaled in support 167.

Bevel gear 166 is keyed to shaft 168 which extends parallel to I beam 70 at the rear of the drop bay stacker assembly, as seen in FIGURE 3, and is journaled at 170 in bracket 171 extending from track 172. The track 172 is similar to the earlier described track 151.

Shaft 168 has keyed thereon bevel gear 180 which meshes with bevel gear 181 keyed on shaft extension 182 which extends from right hand lead screw 183, as best seen in FIGURE 4. Right hand lead screw 183 has a collar 184 which engages thrust bearing 186 journaled in stop 187 which extends from beam 68 at 188. Shaft extension 190 integral with lead screw 183 is journaled in bearing 191 secured at the front of the frame at 192 and has keyed thereon hand wheel 193.

A suitable right hand acme nut 195 engages right hand lead screw 183, the nut 195 being welded or otherwise fixedly secured to bracket 169.

It will be seen that by rotating hand wheel 193 in a clockwise or counterclockwise direction, right hand lead screw 183 will be rotated, thus driving nut 195 along with bracket 169, which journals shaft 148, toward the front or back of frame 63, depending on the direction of rotation of the hand wheel 193. Also, shaft 168 will be rotated through shaft extension 182 and bevel gears 181 and 180. The rotation of shaft 168 will cause bevel gears 165 and 166 to rotate, thus driving nut 158 through the rotation of lead screw 157. The brackets 150 and 169 will be caused to slide along the tracks 151 and 172 whereby shaft 148 on which the rear drop bay 132 pivots will be moved toward the front or rear of frame 63. By this means, the drop bay can be made to accommodate different sizes of sheets.

In order to more fully explain the invention, a gauging table assembly for a press or the like which itself forms no part of the invention is shown at station B in FIGURES 1 and 2. The table assembly is of the type which receives a work sheet at a given reference position and then by means of an automatically controlled prearranged program manipulates the work sheet in, for instance, a punch press or the like wherein the sheet receives a plurality of work operations. The table assembly then returns the sheet to the reference position.

The gauging table assembly 200 has tracks 201 and 202 which slidably support a table surface 203 which receives the work sheet 44 which is suitably held by retractable workholders 206. The table surface 203 can move transversely as well as longitudinally with respect to a machine tool, for instance a press assembly, to manipulate the work sheet in the machine tool. A retractable sheet locator 207 positions the sheet in a direction transverse to that of the positioning by the workholders 206.

For purposes of explanation, the reference position at which the table assembly receives the work sheet to be punched and then delivers the work sheet after punching will be referred to as station B as shown in the drawings. It will be the function of the loader assembly 20 to deliver the work sheet to this station and for the unloader assembly 60 to remove the work sheet from this location. A work sheet 44 is shown in phantom, FIGURE 2, being held by the retractable workholders 206 and being positioned by the sheet locator 207 at the gauging table assembly 200 reference area designated station B.

*Control circuits*

Considering now the electrical circuits of FIGURES 8 and 9, power leads 210, 211 and 212, suitably three-phase commercial frequency (60 cycle) alternating current are connected to hoist motor 33, boom motor 26 and pinch-roll motor 115. Lines 210 and 211 one-phase of the leads are connected to vacuum motor 217.

Across one of the phases of the line, the transformer 218 is connected providing a convenient stepdown to the desired voltage on the controls, suitably 110 volts. The secondary of the transformer 218 is connected to leads 220 and 221 for the controls. Lead 220 is connected through manually operated push button emergency stop switch 222 and manually operated push button control switch 223, through normally open relay contacts 225-1 of control relay 225 to lead 224.

Several main circuit branches are connected between lead 221 and leads 220 and 224, respectively. In sequence from the top of FIGURE 8 and continuing on to FIGURE 9, these circuit branches are designated 226 to 255, respectively.

Circuit 226 provides the power supply for the vacuum pump motor and includes vacuum cup on-off selector switch 256 and vacuum pump motor magnetic starter 257. Circuit 258 bypasses the vacuum motor start contacts 260 in circuit 226 and includes vacuum pump motor magnetic starter contacts 257-1.

Circuit 227 controls the vacuum cup control solenoid and includes vacuum cup on-off switch 261, normally closed relay contacts 262-1 of control relay 262 and vacuum cup control solenoid 219.

Circuit 228 controls the automatic control of the loader and unloader and includes manual control on switch 265 and control relay 263. Line 266 connects circuits 228 and 229. Circuit 229 includes element 267.

Circuit 230 controls the boom motor in its counterclockwise rotation and includes relay contacts 262-2, boom right limit switch 268, normally open relay contacts 270-1, normally closed motor starter contacts 271L-1 and boom motor magnetic starter right 271R. Circuit 231 includes limit switch 272 and control relay 273.

Branch circuit 232 controls the boom motor in its clockwise travel. The circuit includes normally open relay contacts 274-1, normally closed contacts 262-3, boom left limit switch 275, normally open relay contacts 270-2, normally closed relay contacts 271R-1 and boom motor magnetic starter left 271L.

Circuit 233 controls the hoist motor when the hoist is going downward and includes boom left limit switch 275, timer relay contacts 276-1, normally open relay contacts 277-1, normally closed hoist motor magnetic starter contact 285-1 and hoist motor magnetic starter down 280.

Branch 234 includes normally open relay contacts 273-1 and normally open relay contacts 262-5. Branch 235 is responsive to the tension control down limit and includes hoist tension limit switch 281 and control relay 277.

Circuit 236 controls the sheet release and includes normally closed relay contacts 277–2 and normally open timer relay contacts 276–2 and timing relay 282. Circuit 240 includes control relay 262. Circuit 237 includes normally open control relay contacts 277–3 and branch circuit 238 includes normally closed relay contacts 273–2 and normally open relay contacts 262–6.

Branch 241 controls the hoist motor in the upward movement of the hoist and includes timing relay contacts 282–1, normally closed relay contacts 273–3, normally closed relay contacts 270–3, normally closed motor starter contacts 280–1 and hoist motor magnetic starter up 285.

Circuit 242 includes timer relay contacts 286–1. Circuit 243 controls the hoist up limit control and includes hoist up limit switch 287 and control relay 270. Circuit 244 includes normally closed relay contacts 270–4, normally closed relay contacts 262–7, normally open relay contacts 273–4 and timing relay 286.

Circuits 245 and 246, of FIGURE 9, control the cycle. Circuit 245 includes normally closed relay contacts 273–5 and normally open relay contacts 274–2. Branch circuit 245 connects to circuit 246 which includes manual set swith 288 and manual unload cycle switch 290, and cycle control relay 274.

Branch circuit 247 includes carrier forward limit switch contacts 291–1 of carrier forward limit switch 291, normally open relay contacts 274–3, and control relay 292. Branch circuit 248 extending between circuit 224 and circuit 247 includes normally open relay contacts 292–1. Branch circuit 249 extending between branch 247 and branch 221 includes timer 293.

Circuit 250 controls the roller motor and includes normally open relay contact 292–2, carrier retracted limit switch contacts 291–2, of carrier limit switch 291, and roller motor magnetic starter 295.

Branch circuit 251 detects the movement of the work sheet in reference position station A and includes normally open relay contacts 292–3, normally open relay contacts 295–1 and timer 276 which is set to the length of the workpiece 44 being unloaded, as will be later explained in the operation of the device of the invention.

Branch circuit 252 controls the forward motion of the carriage 75 and includes normally open relay contacts 274–4, timer contacts 293–1, and carriage forward solenoid 296.

Branch circuit 253 controls the clamping action of roller 96 and includes normally open relay contact 292–4 and roller clamp solenoid 120.

Circuit 255 controls the sheet stacker doors and includes timer contacts 276–4 and sheet stacker doors solenoid 298.

*Operation*

In operation, the unloader assembly 60, including the pinch-roll sub-assembly 61, and drop bay stacker sub-assembly 62, works simultaneously with the loader assembly 20. The steps in the operation of the unloader and loader are shown in block form in FIGURES 10 and 11 respectively.

The cycle will be described beginning at the position where a workpiece 44 has been processed on the machine tool at station B, the loader boom is at station A and the hoist is raised, and the pinch-roll sub-assembly 61 of the unloader is retracted toward station C. The work holders 206 are clamped on a workpiece 44 at reference position station B.

The operation of the unloader assembly 60 will be described first, with reference being made to the drawings including FIGURE 10, to show the steps involved.

*Operation of unloader*

When the processing of sheet 44 at station B is completed, the operator pushes manual switch 288 and the workholders 206 release and retract from the sheet. The operator then manually pushes unload cycle switch 290. Control relay 274 is energized and closes normally open relay contacts 274–2, locking in the cycle control relay 274. This closes normally open relay contacts 274–4 which energizes carriage 75 forward solenoid 120 in circuit 252. This carriage forward solenoid 120 passes air to the air cylinder 90 as seen in FIGURES 2 and 6 which moves the carriage 75 of the unloader 60 forward as described in step 1 of the block diagram of FIGURE 10 into a position where the drive roll 95 and idler roll 96 are over the work sheet at station B but not in contact with the sheet.

The carriage as it moves forward contacts carrier forward limit switch contacts 291–1 in circuit 247, thus closing the circuit through normally open relay contacts 274–3 which had been previously closed, thus energizing control relay 292 and timer 293. When control relay 292 is energized, normally open relay contacts 292–4 in circuit 253 close, energizing solenoid 297 which passes air to cylinders 101 on the carriage causing piston rods 100 to extend whereby idler roller 96 travels into clamping engagement on sheet 44 as shown in FIGURE 1. This is shown in step 2 of FIGURE 10.

Timer 293 delays a few seconds to allow the clamping action by the rollers as above described after which normally closed timing contacts 293–1 open deenergizing solenoid 120 whereby air under pressure is introduced into cylinder 90 so as to retract piston rod 91 and carriage 75 whereby sheet 44, being clamped between drive roll 95 and idler roll 96 is pulled toward the drop bay stacker sub-assembly 62. This is shown in step 3 of FIGURE 10.

Meanwhile, normally open relay contacts 292–2 in branch circuit 250 close and contacts 291–2 of carriage limit switch 291 close when the carriage retracts under the action of air cylinder 90. This energizes roller motor magnetic starter 295 whereby pinch-roller motor 115 rotates causing sprocket 117 to drive through sprocket chain 118 sprocket 111 on drive roll 95. This translates work sheet 44 from its retracted position away from station B to station C, as shown in step 4 of FIGURE 10. The sheet as it passes through rolls 95 and 96 is received on rear drop bay 132 and front drop bay 131 as best seen in FIGURE 4. The rear drop bay 132 has been previously adjusted by means of hand wheel 193 to provide the proper support for the sheet. The sheet 44 is forced over rollers 138 which are journalled in the bays. The bays are purposely shallow in width so that when they rotate to drop the sheet 44 onto a stack, there will be a minimum of interference with the sheet by the bays since the bays only project under the edges of the sheet, the sheet being self-supporting.

Meanwhile, normally open relay contacts 292–3 have closed and normally open roller motor magnetic starter contacts 295–1 have closed when the roller motor began driving the drive roll to pass the sheet into the drop bay stacker. This energizes timer 276 in circuit 251 which is set to time out when the sheet has passed through the drive roll 95 and the idler roll 96. When timer 276 times out, timer contacts 276–4 close energizing solenoid 298 which passes air to cylinders 146 whereby piston rods 145 are retracted into the cylinders, thus rotating drop bays 131 and 132 allowing sheet 44 to drop onto the stack 300, which rests on a suitable pallet 301 which is capable of beig lifted by a lift truck or the like. This is shown in step 5 of FIGURE 10.

*Operation of loader*

The first step in the operation of the loader comprises rotating the loader 20 in a clockwise direction as viewed from above from station A to station B while the hoist platform 38 is at the upper level of FIGURE 1. This is known as boom left. This rotation is begun when the operator manually depresses the unload cycle switch 290 thus energizing control relay 274, thus closing normally open contacts 274–1 whereby boom motor magnetic starter 271L is energized in branch circuit 232 and boom motor 26 drives pinion 28 engaging ring gear 30, thus rotating the boom in a clockwise direction. The boom continues to rotate in a clockwise direction until it contacts limit switch 275 with a roller 275' as shown in FIGURE 1. Limit switch 275 in branch circuit 232 is open, thus interrupting current to the boom motor 26 whereby boom rotation is stopped in the clockwise direction.

The stopping of clockwise rotation closes boom limit switch contacts 275 in circuit 233, thus potentially energizing hoist motor magnetic starter down 280. Timer contacts 276-1 will be open or closed depending on whether the unloader assembly 60 has taken the punched work sheet from the gauging table assembly 200. If the unloader has taken the sheet from the gauging table, the timer 276 will have timed out and contacts 276-1 will be closed. The hoist motor magnetic starter down 280 will be energized starting the motor 33 down.

If, on the other hand, the timer 276 has not timed out, contacts 276-1 will still be open and the hoist motor magnetic starter down 280 will not be energized but will have to wait. After timer 276 times out and hoist magnetic starter down 280 is energized, the hoist motor 33 allows the hoist platform 38 to drop by unwinding the drums 36 to allow cables 37 to pay out.

When the sheet drops onto the gauging table assembly 200, hoist tension limit switch 281 in branch circuit 235 opens, thus deenergizing control relay 277. Normally open relay contacts 277-1 in circuit 233 open, thus interrupting power to hoist motor magnetic starter down 280. Normally closed relay contacts 277-2 in branch circuit 236 close, energizing timing relay 282 and control relay 262. At this time normally open contacts 276-2 in circuit 236 are closed.

The next step, as shown in block diagram of FIGURE 11, is to release the sheet onto the gauging table at station B. Energizing control relay 262 opens normally closed relay contacts 262-1 in branch circuit 227 deenergizing vacuum cup control solenoid 219. The vacuum cup control solenoid 219 mechanically shuts off the vacuum to the vacuum cups 42 by means of a solenoid valve. This releases the sheet onto the gauging table at station B in the position shown in FIGURE 2 by the phantom lines designated 205. It may be necessary for the operator to manually position the sheet an inch or two in order to get proper and exact positioning against the workholders 206 and the sheet locator 207.

After dropping the work sheet on the table assembly, the hoist platform 38 is lifted upward as indicated by step 4 of FIGURE 11. There is a delay of a few seconds before the hoist starts its upward movement after the vacuum has been cut off. This is to provide passage of some air back through the solenoid valves into the vacuum cups 42 so that there is no dislocation or upward movement of the sheet due to adherence of the work sheet 44 to the cups 42. This few seconds delay is controlled by timing relay 282 which is set to time out for the given number of seconds. At the end of this time delay, contacts 282-1 close energizing hoist motor magnetic starter up in circuit 241.

The hoist is stopped in its upward movement by limit switch 287 in circuit 243 which is tripped by a mechanical arrangement, thus closing and energizing control relay 270. Normally closed relay contacts 270-3 open, deenergizing the hoist motor magnetic starter 285, thus stopping hoist motor 33. At this position, the hoist platform 38 is in an upper position at station B. The boom is now ready to be rotated in a counterclockwise direction as indicated in step 5 of FIGURE 11. Energizing control relay 270 closes relay contacts 270-1, energizing boom motor magnetic starter 271R, energizing boom motor 26 to rotate the boom in a counterclockwise direction toward station A.

The boom is stopped in its counterclockwise direction above station A when boom right limit switch 268 in circuit 230 is open, thus deenergizing boom motor magnetic starter right 271R in circuit 230. This stops boom motor 26 which is rotating the boom. At the same time limit switch contacts 272-1 close energizing control relay 273 in circuit 231. This is step 5 in the block diagram of FIGURE 11.

The hoist platform 38 is now lowered as shown in step 6 of FIGURE 11. Energizing control relay 273 closes normally open contacts 273-1 through previously closed contact 262-5 through previously closed contact 277-1 to energize hoist motor magnetic starter down 280. The hoist continues down as in step 6 until the frame 38 mounting the vacuum cups 42 rests against the stack of plates at station A. At this point tension is relieved from the cables 37 deactuating hoist tension limit switch 281 deenergizing control relay 277. This opens normally open relay contact 277-1 deenergizing hoist motor magnetic starter down 280. This stops the hoist on its downward movement.

The next step is to pick up the sheet as shown in step 7. Deenergizing control relay 277 opens relay contacts 277-3, deenergizing timing relay 282 and control relay 262. Deenergizing control relay 262 closes normally closed relay contacts 262-1, energizing vacuum cup control solenoid 219, applying vacuum to the cups 42 from the vacuum motor. At this stage vacuum is applied to the cups 42 and the hoist is in a downward position at station A. Deenergizing control relay 262 also closes normally closed contacts 262-7 in circuit 244, energizing timing relay 286. Timing relay 286 has a sufficient timing delay to allow the vacuum to collapse the cups 42 and provide adequate suction on the sheet. This completes step 7.

In step 8 the hoist platform 38 is brought up into a vertically upward position at station A. After timing relay 286 times out, contacts 286-1 are closed energizing hoist motor magnetic starter 285. This causes the hoist motor 33 to rotate whereby cables 37 are brought up, thus raising the sheet 44 in an upward direction. The hoist is stopped by the hoist upper limit switch 287 which closes in circuit 243 and energizes control relay 270 whereby relay contacts 270-3 in circuit 241 open and hoist motor magnetic starter up 285 is deenergized stopping hoist motor 33.

The cycle control relay 274 in circuit 246 was deenergized when normally closed control relay 273-5 was energized when the boom reached station A in its counterclockwise travel. This completes the loader cycle operation.

The cycle is now ready to be repeated.

In view of our invention and disclosure variations and modifications to meet individual whim or particular need will doubtless become evident to others skilled in the art, to obtain all or part of the benefits of our invention without copying the method and structure shown, and we therefore claim all such insofar as they fall within the reasonable spirit and scope of our invention.

Having thus described our invention, what we claim as new and desire to secure by Letters Patent is:

1. In a sheet handling device for repetitiously placing work sheets into, and removing work sheets from, a reference position on a machine tool:
    a loader, including a power rotating jib crane and a power hoist, for transferring by rotation and translation a sheet from a first stack of sheets at a first position into the reference position; an unloader including a reciprocating carriage journalling a system of power operated rotating pinch rolls which move over and selectively clamp onto the work sheet in the reference position, for translating a sheet from the reference position to a second position, and a stacker having a drop bay with doors hinged on a horizontal axis for receiving the sheet from the first means and dropping the sheet onto a second stack, and electrical control means for automatically operating the loader and the unloader including the reciprocating carriage and the stacker, wherein the sheets are taken from the first stack at the first position by the loader and placed in a second stack at the second position by the unloader.

2. A device of claim 1, wherein the loader and unloader operate continuously.

3. A device of claim 1, wherein the loader and unloader operate simultaneously.

4. A device of claim 1, wherein the hoist at the pickup end has a vacuum pickup system containing vacuum cups.

5. A device of claim 1, in which the doors are adjustable.

6. A device of claim 1, in which the doors are rotated downward by means of air cylinders to discharge the work sheet.

References Cited

UNITED STATES PATENTS

| | | | |
|---|---|---|---|
| 591,223 | 10/1897 | North | 271—81 |
| 1,688,219 | 10/1928 | Williams | 214—6 |
| 2,315,003 | 3/1943 | Martin et al. | 214—6 |
| 2,576,204 | 11/1951 | Allen | 271—81 |
| 2,941,499 | 6/1960 | Gutzmer | 214—6 |
| 3,031,906 | 5/1962 | Holman | 214—6 |
| 3,178,041 | 4/1965 | Wheat | 214—6 |
| 3,194,417 | 7/1965 | Dunsmore et al. | 214—6 |

ROBERT G. SHERIDAN, *Primary Examiner.*

GERALD M. FORLENZA, *Examiner.*

J. E. OLDS *Assistant Examiner.*